Inventor
AUGUST W. SKOG
By Paul, Paul & Moore
Attorneys

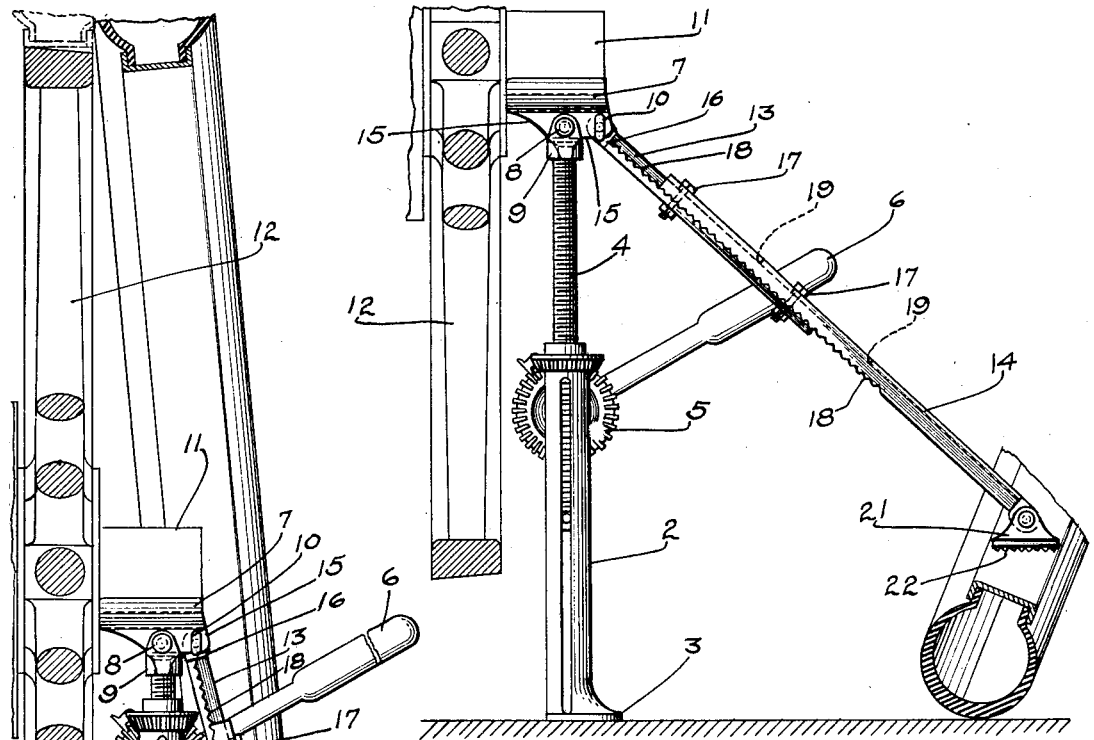
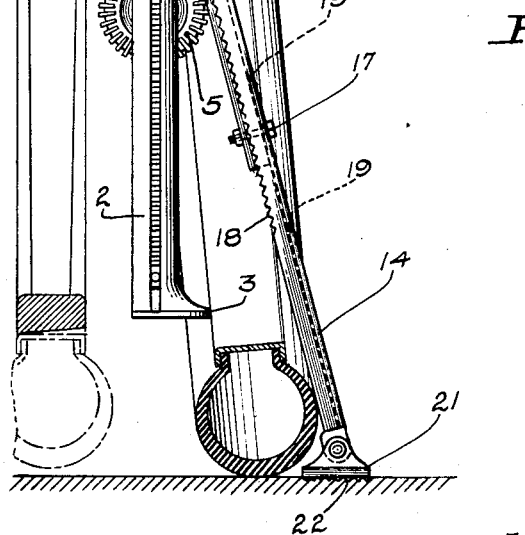
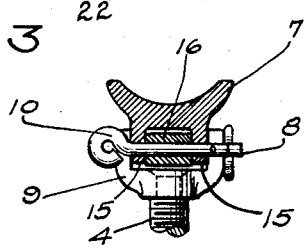
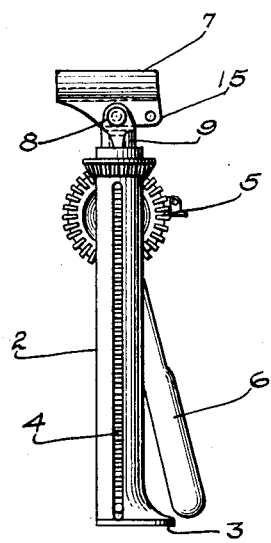

Patented July 4, 1933

1,916,497

UNITED STATES PATENT OFFICE

AUGUST W. SKOG, OF MINNEAPOLIS, MINNESOTA

LIFTING JACK

Application filed February 27, 1928. Serial No. 257,410.

This invention relates to an improved lifting device, particularly adapted for use to lift the wheel of a motor vehicle, as when changing tires, and an object of the invention is to provide such a device including a conventional lifting jack, having an auxiliary load-supporting member pivotally connected therewith and adapted to have the load transferred thereonto, after the load has been elevated to a certain height, by the operation of the jack, whereby the member will support the load independently of the jack.

A further object of the invention is to provide a lifting jack comprising a head adapted to engage the outer hub or hub cap of the vehicle wheel, and having an auxiliary load-supporting member pivotally connected with the head and arranged in such a manner that when the load has been raised to an elevation to permit the removal of the tire from the wheel, the load may be transferred onto said auxiliary member by reversing the operation of the jack, and moving the lower end of the jack out of engagement with the ground and elevating it to a height to permit the lower portion of the tire to be passed under the base of the jack, after which the jack may be operated to again move it into engagement with the ground and to transfer the load from the auxiliary member back onto the jack, thereby permitting the auxiliary member to be swung outwardly to permit the removal of the tire from between the jack and the supporting member.

A further object is to provide a jack constructed in such a manner that when engaged with the outer hub or hub cap of an automobile wheel, and the jack is operated to elevate the wheel to lift the tire out of engagement with the ground, the tire, after being detached from the wheel, may be removed therefrom and the jack operated to permit the removal of the tire from the wheel and clear of the jack, while the wheel is being supported by the jack engaging the outer hub or hub cap of the wheel.

Features of the invention reside in the provision of such a lifting device comprising a jack, having an auxiliary load-supporting member provided with means for engaging the outer hub or hub cap of an automobile wheel, and the jack and auxiliary member being adapted to alternately support the wheel in an elevated position to permit the removal of the tire therefrom and also to permit another one to be substituted therefor, while the lifting device is engaged with the outer hub cap of the wheel; in the particular connection between the lifting jack and the auxiliary load-supporting member which permits the auxiliary member to be detached from the jack so that the latter may be used as an ordinary jack; in the means provided for longitudinally adjusting the auxiliary load-supporting member to adapt the device for wheels and tires of various sizes; and, in the general construction of the device as a whole, which is very simple and inexpensive and may be manufactured at a minimum cost.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification;

Figure 3 illustrates the position of the jack after having been operated to transfer the load onto the load-supporting member, and also showing the lower end of the jack elevated to a position to permit the lower portion of the tire to pass therebeneath;

Figure 4 shows the jack returned to its normal load-supporting position to relieve the auxiliary member of the load, thereby allowing the member to be swung outwardly to permit the removal of the tire from between the jack and said member;

Figure 5 is an enlarged detailed sectional view on the line 5—5 of Figure 1;

Figure 7 is a view showing the jack with the auxiliary load-supporting member detached therefrom.

Figures 1, 2:
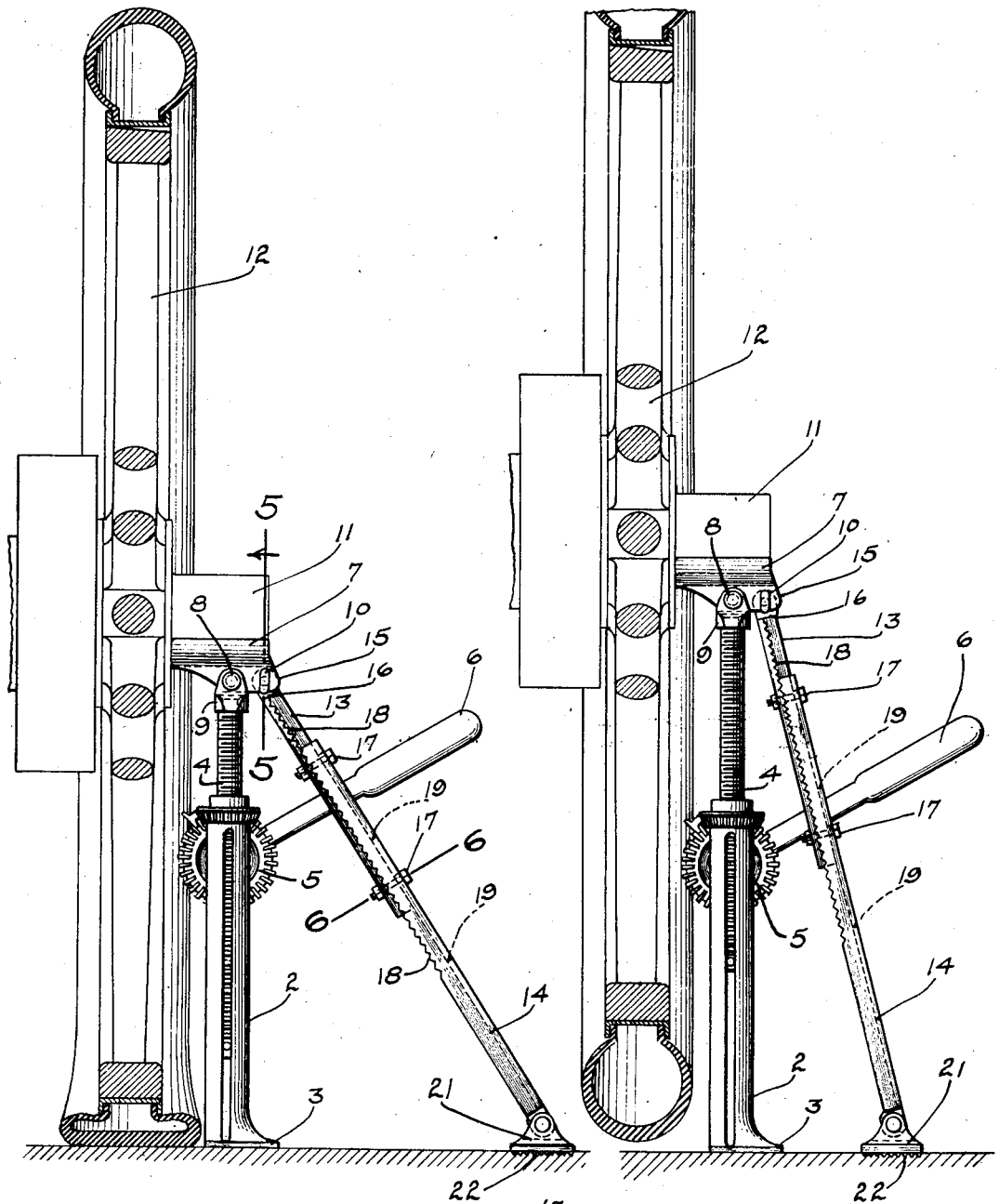
Figure 1 is a sectional elevation of an automobile wheel showing the tire deflated and the improved lifting device positioned to elevate the wheel.
Figure 2 is a similar view showing the jack extended to lift the punctured tire out of engagement with the ground and showing the auxiliary lifting member in position to support the load.

Briefly, the purpose of the present invention is to provide a jack arranged in such a manner that it may be engaged with the outer hub or hub cap of an automobile wheel, instead of having to be engaged with the axle of the vehicle to elevate the wheel to permit the removal of the tire therefrom, thereby eliminating the usual objection of having to partially crawl under the vehicle to place the jack in lifting position.

In the selected embodiment of the invention, there is illustrated, for purposes of disclosure, a conventional lifting jack comprising a body 2 having a base member 3, and a threaded member 4 movable in the body 2 by means of a suitable lifting mechanism 5, operable by an operating handle 6 as shown. A lifting head 7 is pivotally connected with the upper end of the threaded member 4 by means of a pin 8 and a forked member 9 secured to the member 4. The lifting head is concaved, as shown in Figure 5, to receive the usual hub or hub cap 11 of the vehicle wheel 12.

Figure 6:
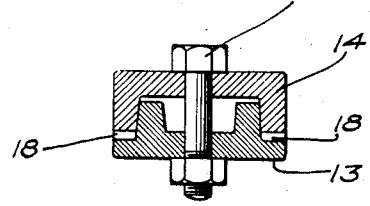
Figure 6 is an enlarged cross sectional view on the line 6—6 of Figure 1.

An auxiliary load-supporting member comprising sections 13 and 14, is pivotally connected with the lifting head 7 by means of a suitable eye-bolt or pin 10, as shown in Figure 5. The lower portion of the lifting head 7 is provided with spaced flanges 15, as shown in Figure 5, between which the upper end 16 of the section 13 of the auxiliary member is mounted. These flanges and also the upper end of the member 13 are apertured to receive the eye-bolt 10. The two sections 13 and 14 of the auxiliary load-supporting member are adjustably secured together by suitable bolts 17. Each section is preferably flanged or ribbed as shown in Figure 6, and each is further provided with teeth 18 adapted to interlock to prevent relative longitudinal movement of the members, when in load-supporting position. The section 14 is provided with slots 19 adapted to receive the bolts 17, as indicated in dotted lines in Figure 4, to permit longitudinal adjustment of the sections with respect to each other. A foot member 21 is pivotally connected to the lower end of the section 14 of the load-supporting member, and is provided with suitable teeth 22 adapted to dig into the ground to prevent slippage of the member when the latter is engaged with the ground to support a load, as shown in Figure 3.

The novel lifting device or jack featured in this invention permits the removal of the tire from the vehicle wheel when the device is engaged with the outer hub or hub cap of the wheel, as clearly shown in Figures 1, 2, 3, and 4. To remove the tire from the wheel, the lifting head 7 of the jack is engaged with the wheel hub 11, as shown in Figure 1. When the lifting head is thus initially engaged with the hub 11, it will be noted that the lower end of the auxiliary load-supporting member will be spaced a considerable distance from the base 3 of the jack. As the jack is operated to lift the load, by oscillation of the jack handle 6, the foot member 21 of the auxiliary load-supporting member will slide or drag along the surface of the ground or floor until the jack has been operated to elevate the wheel to the necessary height to move the lower portion of the tire out of engagement with the ground, as shown in Figure 2. The operating mechanism 5 of the jack will then be reversed so that when the handle 6 is again operated, the base member 3 of the jack will move out of engagement with the ground as a result of the position of the auxiliary load-supporting member, thereby causing the load to be transferred onto the member and permitting the body of the jack to be elevated to the position shown in Figure 3. The tire may then be passed beneath the jack body to the position shown in Figure 3. The operating mechanism 5 of the jack is then restored to its normal lifting position, thereby causing the body of the jack to be lowered into engagement with the ground as the jack handle is again operated. When the base 3 of the jack again engages the ground, the load will be transferred from the auxiliary load-supporting member back onto the jack, after which the member may be swung outwardly, as illustrated in Figure 4, to permit the removal of the tire from between the body 2 of the jack and the load-supporting member.

From the foregoing, therefore, it will readily be seen and understood that by the employment of this novel lifting device, a tire may readily be removed from a wheel, when the device is engaged with the outer hub or hub cap thereof, thus avoiding the necessity of having to partially crawl under the vehicle to position the jack, as is necessary when using a jack of ordinary construction, which must be engaged with the vehicle axle or some portion of the vehicle adjacent thereto. This novel lifting device has been found desirable particularly when used in connection with automobiles equipped with balloon tires, because when a balloon tire, which is relatively large in diameter cross-sectionally, becomes deflated, the body of the vehicle usually descends to a position comparatively close to the ground, so that it is often rather difficult to place the jack under the vehicle in position to elevate the wheel supporting the deflated tire. As before stated, by the employment of this novel lifting device, the vehicle wheel may readily be lifted out of engagement with the ground by simply engaging the jack with the outer hub or hub cap of the wheel.

If desired, this novel device may be used as an ordinary lifting jack by simply detaching the auxiliary load-supporting member from the lifting head 7 as shown in Figure 7. The auxiliary load-supporting member may readily be removed from the head by simply withdrawing the eye-bolt 10, shown in Figure 5. In the drawings, I have shown a lifting jack of ordinary construction, as being used in connection with this novel lifting device. It is to be understood, however, that any suitable jack may be employed without departing from the scope of the invention, the primary object of the invention being to provide a lifting device comprising two members, adapted independently and alternately to support the wheel in elevated position while changing tires.

I claim as my invention:

1. The combination with a lifting jack having a head connected therewith adapted to engage a wheel hub on the outer side of the wheel, of an auxiliary load-supporting member having one end movably connected with said head and its opposite end engaged with the ground whereby when the jack is operated to lift the load, the load may be shifted from said jack onto said member to permit the removal of the tire.

2. The combination with a lifting jack, of an auxiliary load-supporting member pivotally connected therewith and adapted to support the load independently of the jack, after the load has been elevated, and the jack is operated to partially lower the load.

3. The combination with a lifting jack including a head adapted to engage a wheel hub, of an auxiliary load-supporting member pivotally connected with said head and adapted to support the wheel independently of said jack, when the wheel has been elevated by said jack.

4. The combination with a lifting jack including a head adapted to engage an outer wheel hub, of an auxiliary load-supporting member pivotally connected with said head and adapted to support the wheel independently of said jack, when the load has been raised to a certain height by operation of the jack, said auxiliary member being extensible in length.

5. A lifting device comprising means adapted to engage a wheel hub, legs pivotally connected with said means and each having one end adapted to engage the ground, means on one of said legs cooperable therewith to lift a vehicle wheel from the ground, said legs being adapted to alternately and independently support said wheel to permit the removal of the tire therefrom while the device is still engaged with the wheel hub.

6. A lifting device comprising a head and two legs pivotally connected thereto and each having one end adapted to engage the ground, said head being adapted to engage a load, and one of said legs having means cooperable therewith to elevate the load and to effect the transfer of said load onto said other leg.

7. A lifting device for automobile wheels comprising a head adapted to engage a wheel hub, two legs pivotally connected with said head and each having one end adapted to engage the ground, means for longitudinally extending one of said legs to lift the load, and the other of said legs being adapted to automatically assume a load-supporting position during the lifting of the load whereby, when the operation of said means is reversed to retract said extensible leg, the load will be transferred onto the other of said legs.

8. A lifting device comprising a jack having a lifting head adapted to engage a wheel hub on the outer side of the wheel, an auxiliary load-supporting member having one end pivotally connected with said head and its opposite end adapted to engage the ground away from the base of said jack, the lower end of said auxiliary member being adapted to move inwardly in a direction towards the base of the jack, when the upper end thereof is raised because of the jack being operated to lift the wheel, and whereby, when the jack is operated to lower the load, said load will be transferred onto said auxiliary member after which the jack may be moved out of engagement with the ground to permit the tire to be passed beneath it to a position between the jack and said auxiliary member, and when the operation of said jack is reversed to move it into engagement with the ground, the load will be transferred back to the jack, thereby releasing said auxiliary member and permitting the removal of the tire.

9. A lifting device including a head adapted to engage a load and having two load-supporting members pivotally connected therewith and each capable of supporting the load independently of the other, means on one of said load-supporting members for operating said device to raise or lower the load, the pivotal connection of the other of said members with said head being such as to cause it to assume a load-supporting position during raising of the load.

In witness whereof, I have hereunto set my hand this 23d day of February 1928.

AUGUST W. SKOG.